United States Patent [19]

Rogala et al.

[11] Patent Number: 4,964,608
[45] Date of Patent: Oct. 23, 1990

[54] VEHICLE SEAT ADJUSTER WITH INTEGRAL POSITIVE LOCKING TRAVELING SEAT BELT ANCHORAGE

[75] Inventors: Richard L. Rogala, Howell; Omar D. Tame, West Bloomfield, both of Mich.

[73] Assignee: Hoover Universal, Inc., Ann Arbor, Mich.

[21] Appl. No.: 308,650

[22] Filed: Feb. 9, 1989

[51] Int. Cl.$^5$ .......................................... F16M 13/00
[52] U.S. Cl. .................................................. 248/429
[58] Field of Search ...................... 248/424, 429, 430; 297/344

[56] References Cited

U.S. PATENT DOCUMENTS

| | | | |
|---|---|---|---|
| 3,237,907 | 3/1966 | Dall | 248/430 |
| 3,469,812 | 9/1969 | Wonell | 248/430 |
| 4,168,051 | 9/1979 | Terada | 248/429 |
| 4,707,030 | 11/1987 | Harding | 248/430 |
| 4,781,354 | 11/1988 | Nihei | 248/429 |

FOREIGN PATENT DOCUMENTS

| | | | |
|---|---|---|---|
| 1399143 | 5/1965 | France | 248/429 |
| 1546166 | 5/1979 | United Kingdom | 248/429 |

Primary Examiner—Ramon O. Ramirez
Assistant Examiner—Robert A. Olson
Attorney, Agent, or Firm—Harness, Dickey & Pierce

[57] ABSTRACT

A seat adjuster particularly adapted for motor vehicle seats. The seat adjuster enables fore-and-aft movement of the seat and also provides an anchorage point for a seat belt restraint system which moves with the seat during adjustment. The seat adjuster includes a fixed base adapted for attachment to the vehicle's floor pan which forms an elongated toothed rack. A sliding rail which moves along the base includes a latching mechanism. The latching mechanism has a latching plate which is movable vertically and includes engagement features which mesh with the toothed rack on the base. In the normal condition, the latching plate is in an upward vertically moved position in engagement with the toothed rack thereby setting the adjusted position of the seat and providing firm support for the seat belt anchorage attached to the latching mechanism. When adjustment is desired, a release bar is actuated which moves the latching plate downward thereby disengaging the engagement features. The seat adjuster mechanism accordingly combines the functions of the seat adjuster and seat belt anchorages to provide an efficient and structurally secure seat adjuster.

12 Claims, 2 Drawing Sheets

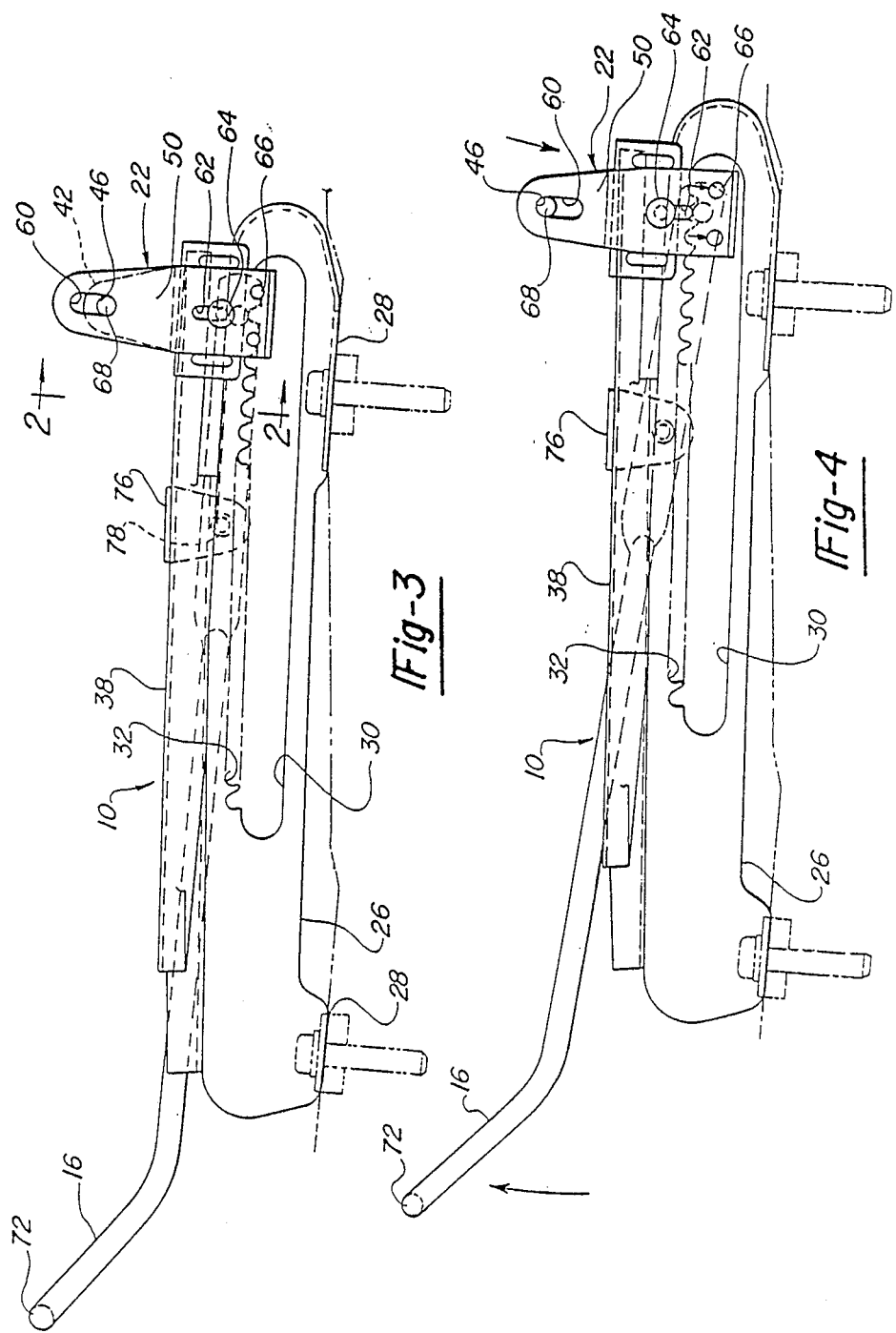

VEHICLE SEAT ADJUSTER WITH INTEGRAL POSITIVE LOCKING TRAVELING SEAT BELT ANCHORAGE

BACKGROUND AND SUMMARY OF THE INVENTION

This invention relates to an automotive seat adjuster and particularly to one providing a seat belt anchorage which moves with the seat during fore-and-aft adjustment.

Current Federal Motor Vehicle Safety Standards require that automobiles be equipped with an occupant protection system as a safety feature during vehicle impact. The typical form for such an occupant protection system is a seat belt which physically restrains the occupant during impact. In order to accommodate various sizes and shapes of occupants, the front seats of motor vehicles are provided with a fore-and-aft adjustment mechanism to enable the occupant to position themselves a desired distance from the vehicle instrument panel, steering wheel and brake pedal. In many seat designs according to the prior art, anchorages for the seat belts are fastened to the vehicle floor pan at the outboard sides of the seat. When the seat position is adjusted, the seat belt becomes tightened or loosened around the occupant, requiring it to be readjusted. Mounting the seat belt anchorages to a movable portion of the seat avoids this problem, however, such designs impose cost and weight penalties since the adjuster must designed to withstand extreme mechanical loads.

This invention is directed to a design of a seat adjuster with a seat belt anchorage that moves with the seat during adjustment which provides the necessary structural integrity. The seat adjuster according to this invention has a seat adjuster latch mechanism which acts as the belt anchorage which achieves simplicity of operation and design. Significantly, at every adjusted position of the seat, the adjuster latching mechanism and the belt anchorage is in positive locking engagement with a fixed portion of the seat adjuster, thereby providing reliable and immediate restraint of seat belt loads.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 3 a side elevational view of the seat adjuster mechanism of FIG. 1 in a normal engaged position.

FIG. 4 elevational view similar to FIG. 3 but showing the seat adjuster mechanism in a released position permitting fore-and-aft adjustment of the seat.

DETAILED DESCRIPTION OF THE INVENTION

Figure 1:
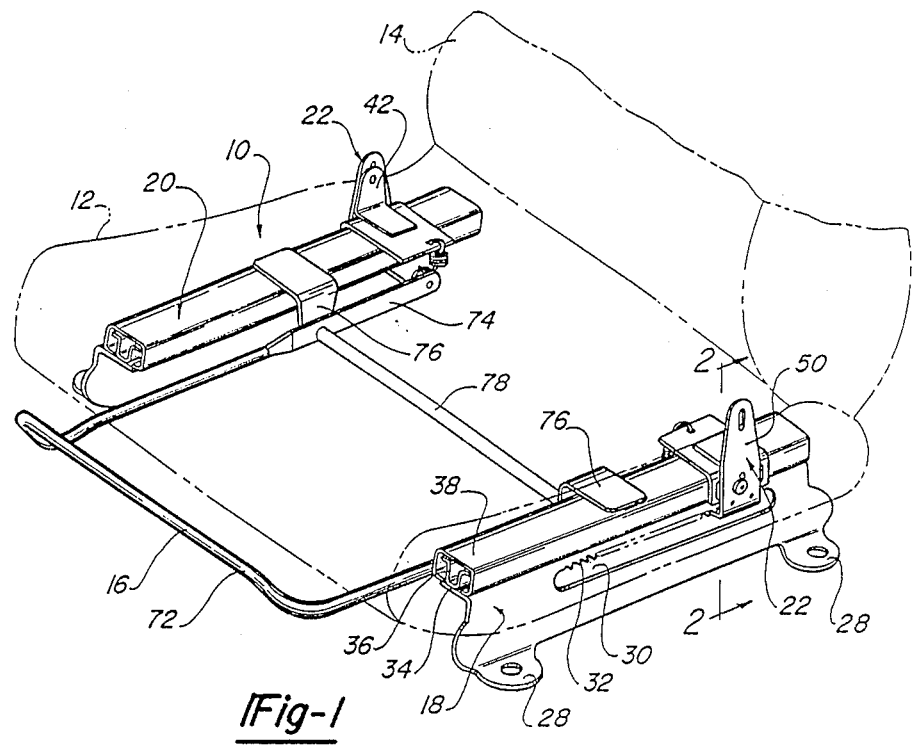
FIG. 1 is a partial pictorial view of the seat adjuster in accordance with this invention shown with a seat bottom and back cushion in phantom lines.

A seat adjuster mechanism in accordance with this invention is shown in FIG. 1 and is generally designated by reference number 10. As shown, seat adjuster 10 supports and mounts seat cushion 12 and seat back 14, both shown in phantom lines. Seat adjuster 10 generally comprises release bar 16, left and right-hand adjuster rail assemblies 18 and 20, and latch mechanism 22.

Rail assembly 18 is best described with reference to FIGS. 1 and 2. Since right and left-hand rail assemblies 18 and 20 are mirror images of each other, only the left-hand rail assembly will be described in detail. Base 26 forms a pair of separated feet 28 for mounting of the seat adjuster to a vehicle floor pan structure using fastening bolts, etc. Base 26 has a vertical surface with an elongated slot 30 having an upper surface forming a toothed rack 32. Base 26 further has an upper portion which extends horizontally and forms attaching flange 34. U-shaped slide track 36 is joined to attaching flange 34, preferably through welding. Sliding rail 38 has an inverted "U" cross-sectional shape and engages slide track 36 in an interlocking manner. Slide bearings or pads (not shown) are positioned between track 36 and rail 38, and allow the rail to move smoothly along the track in order to enable fore-and-aft movement of the seat.

Figure 2:
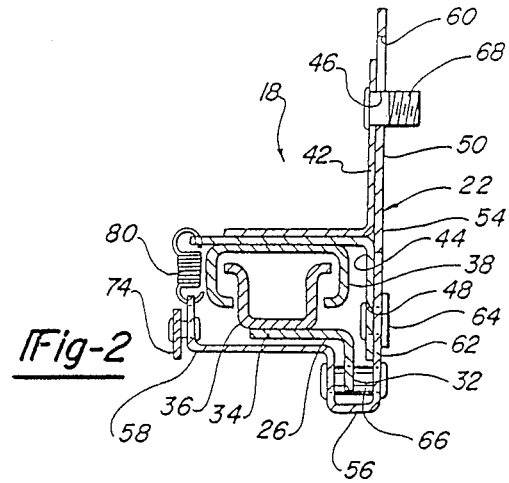
FIG. 2 a cross-sectional view taken along line 2—2 from FIG. 1.

Latch mechanism 22 includes plates 42 and 44 which each have a letter "L" shape and are fastened to the top surface of sliding rail 38, as best shown in FIG. 2. The upwardly extending portion of plate 42 forms anchorage hole 46, whereas the downwardly extending surface of plate 44 forms rivet hole 48.

Latching plate 50, best shown in FIGS. 1 and 2, has a vertically extending portion 54 which overlies the vertical surfaces of plates 42 and 44, and further has reversely bent center portion and inboard extending portion 58. Latch plate vertical portion 54 includes a pair of elongated slots 60 and 62 which overlie plate holes 46 and 48, respectively. Rivet 64 is placed through hole 48 and slot 62, and permits latching plate 50 to move vertically through a limited range of motion. A pair of engagement posts 66 are attached to latching plate center portion 56 and are provided to mesh with toothed rack 32, as will be explained in more detail below.

Seat adjuster release bar 16 has a generally U-shape with a center portion 72 for manual actuation and a pair of ends 74. Release bar pivot plates 76 are rigidly affixed to sliding rail 38 of both rail assemblies 18 and 20. Pivot shaft 78 traverses the seat and engages both of pivot plates 76, thus allowing release bar 16 to pivot about shaft 78. Each of release bar ends 74 is pinned to latch plate 50, as best shown in FIG. 2. Spring 80 biases release bar ends 74 in an upward direction, thus biasing bar center portion 72 downwardly. The seat belt restraint system (not shown) is fastened to latching mechanism 22 through a bolt 68 or other fastener which engages latching plate 50 and plate 42 through hole 46 and slot 60.

With particular reference to FIGS. 3 and 4, operation of seat adjuster 10 will be described. FIG. 3 illustrates the normal positioning of the components when a desired adjusted position for the seat is set. In the normal condition of the adjuster, the upward biasing force exerted by spring 80 forces engagement posts 66 into engagement with the teeth of rack 32. This engagement locks slide track 36 and sliding rail 38 together, thus setting the fore-and-aft position of the seat. In the event of vehicle impact, seat belt loads directed through anchorage bolts 68 are coupled directly to base 26 which provides the necessary structural integrity to restrain these extreme loads. When the operator desires to change the fore-and-aft adjusted position of the seat, release bar center portion 72 is lifted as shown in FIG. 4. This motion causes release bar ends 74 to move downward, which also moves latching plate 50 downward against the biasing force of spring 80. As shown in FIG. 4, latching plate 50 moves downward with respect to plates 42 and 46 which causes engagement posts 66 to disengage base rack 32. In this condition, the seat fore-and-aft position may be moved to any desired position since base 26 and sliding rail 38 are disengaged. Once the desired position is reached, release bar center portion 72 is released which allows engagement posts 66 to re-engage rack 32 at the desired position.

Although seat adjuster 10 described herein includes right and left-hand rail assemblies each having latching plates which act as seat belt anchorages, in some applications, only one of the rail assemblies would act as a belt anchorage. Additional variations would include latching plates of various configurations for placing the seat belt anchorages at the desired position relative to the seat occupant.

While the above description constitutes the preferred embodiments of the present invention, it will be appreciated that the invention is susceptible of modification, variation and change without departing from the proper scope and fair meaning of the accompanying claims.

What is claimed is:

1. A seat adjuster for a motor vehicle seat assembly enabling fore-and-aft adjustment of the seat and providing an anchorage point for a seat belt restraint system which moves with the seat during adjustment, comprising:
   a base having mounting means for attachment to a motor vehicle,
   a toothed rack on said base,
   a sliding rail slidably movable with respect to said base and adapted to be coupled to said seat,
   a latch mechanism carried by said sliding rail and having engagine means for meshiing with said toothed rack, said latch mechanism movable to an engaged position wherein said engaging means meshes with said toothed rack thereby coupling said base and said sliding rail together preventing seat adjustment, and to a disengaged position in which said engaging means engages disengages said toothed rack enabling said sliding rail to be moved along said base permitting the position of said seat to be adjusted,
   release means for moving said latch mechanism between said engaged and disengaged positions,
   a latch plate coupled to said sliding rail including anchorage means for enabling said seat belt restraint system to be attached to said seat adjuster and further including means for supporting said release means as said release means is moved between said engaged and disengaged positions and
   said latch mechanism including a latching plate having a slot with said anchorage means disposed through said slot whereby said anchorage means and said slot support said latching plate and allows said latching plate to be moved as said latch mechanism is moved between said engaged and disengaged positions.

2. A seat adjuster as set forth in claim 1 wherein said toothed rack is formed integrally by said base.

3. A seat adjuster as set forth in claim 1 further comprising a slide track attached to said base and interfitting with said sliding rail to permit sliding movement of said rail along said track.

4. A seat adjuster as set forth in claim 1 wherein said base forms an elongated slot with an upper surface thereof defining said toothed rack and wherein said latch mechanism moves in a vertical direction wherein said latching mechanism is moved upward to said engaging position and downward to said disengaged position.

5. A seat adjuster as set forth in claim 1 wherein said release means comprises a release bar extending forward and having a center portion for manual actuation by the occupant and pivotably affixed to said seat adjuster and an end coupled to said latch mechanism for moving said mechanism between said engaged and disengaged positions.

6. A seat adjuster as set forth in claim 1 wherein a pair of said seat adjusters are provided which are laterally separated and support said seat assembly and further wherein said release means engages both said seat adjusters.

7. A seat adjuster as set forth in claim 1 wherein said latching plate reinforces said latch plate in response to loads exerted onto said anchorage bolt by said restraint system.

8. A seat adjuster for a motor vehicle seat assembly enabling fore-and-aft adjustment of the seat and providing an anchorage point for a seat belt restraint system which moves with the seat during adjustment, comprising:
   a base having mounting means for attachment to a motor vehicle, and defining a toothed rack with downwardly projecting teeth,
   a slide track attached to said base,
   a sliding rail interengaged with said slide track and slidably movable thereon and adapted to be coupled to said seat,
   a latch plate coupled to said sliding rail,
   an anchorage bolt carried by said latch plate for attachment of said belt restraint system,
   a latching plate supported by said latch plate having a vertically elongated slot with said anchorage bolt disposed through said slot whereby said bolt and said slot support said latching plate for vertical movement and having engaging means for meshing with said toothed rack, said latching plate movable to a vertically upward engaged position wherein said engaging means meshes with said toothed rack thereby coupling said base and said sliding rail together preventing seat adjustment, to a vertically downward disengaged position in which said engaging means disengages said toothed rack enabling said sliding rail to be moved along said slide track permitting the position of said seat to be adjusted, and
   a release bar mounted to said sliding rail for pivotable movement and having an end engaging said latching plate for actuating said latching plate.

9. A seat adjuster as set forth in claim 8 wherein said toothed rack is formed integrally by said base.

10. A seat adjuster as set forth in claim 8 wherein said release bar has a center portion for manual actuation by the occupant and pivotably affixed to said seat adjuster and an end coupled to said latching plate for moving said latching plate between said engaged and disengaged positions.

11. A seat adjuster as set forth in claim 8 wherein a pair of said seat adjusters are provided which are laterally separated and support said seat assembly and further wherein said release bar engages both said seat adjusters.

12. A seat adjuster as set forth in claim 8 wherein said latching plate reinforces said latch plate in response to loads exerted onto said anchorage bolt by said restraint system.

* * * * *

UNITED STATES PATENT AND TRADEMARK OFFICE
CERTIFICATE OF CORRECTION

PATENT NO.   : 4,964,608

DATED        : October 23, 1990

INVENTOR(S)  : Richard L. Rogala, Omar D. Tame

It is certified that error appears in the above-identified patent and that said Letters Patent is hereby corrected as shown below:

Column 3, Claim 1, line 36, "engagine" should read --engaging--.

Column 3, Claim 1, line 36, "meshiing" should read --meshing--.

Signed and Sealed this

Ninth Day of June, 1992

Attest:

DOUGLAS B. COMER

*Attesting Officer*   *Acting Commissioner of Patents and Trademarks*